US006311058B1

United States Patent
Wecker et al.

(10) Patent No.: US 6,311,058 B1
(45) Date of Patent: Oct. 30, 2001

(54) SYSTEM FOR DELIVERING DATA CONTENT OVER A LOW BIT RATE TRANSMISSION CHANNEL

(75) Inventors: Dave Wecker, Bothell; Vinay Deo, Bellevue; John Mark Miller, Kirkland; David Tuniman; Michael J. O'Leary, both of Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/107,666

(22) Filed: Jun. 30, 1998

(51) Int. Cl.[7] ....................................... H04M 3/00
(52) U.S. Cl. ......................... 455/418; 455/419; 455/412
(58) Field of Search .................................. 455/412, 437, 455/422, 403, 418, 419, 186; 370/486, 85.13; 379/93.25; 395/500, 200.34; 700/10; 600/300

(56) References Cited

U.S. PATENT DOCUMENTS

| 5,559,800 | * | 9/1996 | Mousseau et al. ................ 370/85.13 |
| 5,799,151 | * | 8/1998 | Hoffer ............................ 395/200.34 |
| 5,905,856 | * | 5/1999 | Ottensooser ..................... 395/183.14 |
| 5,923,738 | * | 8/1999 | Cardillo, IV et al. ............ 379/93.25 |
| 5,935,060 | * | 8/1999 | Iliff .................................... 600/300 |
| 5,943,496 | * | 8/1999 | Li et al. ............................... 395/685 |
| 5,946,326 | * | 8/1999 | Rinne ................................... 370/486 |
| 5,963,944 | * | 10/1999 | Adams .................................. 707/10 |
| 5,974,085 | * | 10/1999 | Smith .................................. 375/222 |
| 5,974,238 | * | 10/1999 | Chase, Jr. ...................... 395/200.78 |
| 6,005,490 | * | 12/1999 | Higashihara ................... 340/825.72 |
| 6,041,183 | * | 3/2000 | Hayafune et al. .................... 395/712 |
| 6,151,610 | * | 11/2000 | Senn et al. ........................... 707/516 |

OTHER PUBLICATIONS

"Dynamic Documents: Mobile Wireless Access to the WWW", by M. Frans Kaashoek et al., *IEEE*, Dec. 8, 1994, pp. 179–184.

"Extending HTML in a principled way with displets", by Fabio Vitali, Chao–Min Chiu, Michael Bieber, *Computer Networks and ISDN Systems*, vol. 29, No. 8–13, Sep. 1, 1997, pp. 1115–1128.

"Minstrel™ Plus" brochure, for Novatel Wireless, Inc., copyright 1998.

* cited by examiner

*Primary Examiner*—Daniel Hunter
*Assistant Examiner*—C. Chow
(74) *Attorney, Agent, or Firm*—Joseph R. Kelly; Westman, Champlin & Kelly, P.A.

(57) ABSTRACT

The present invention provides a system by which information content data is delivered to a mobile device. The web content is divided into data and script information. The script information is used to operate on the data to render the data in a predetermined format.

34 Claims, 6 Drawing Sheets

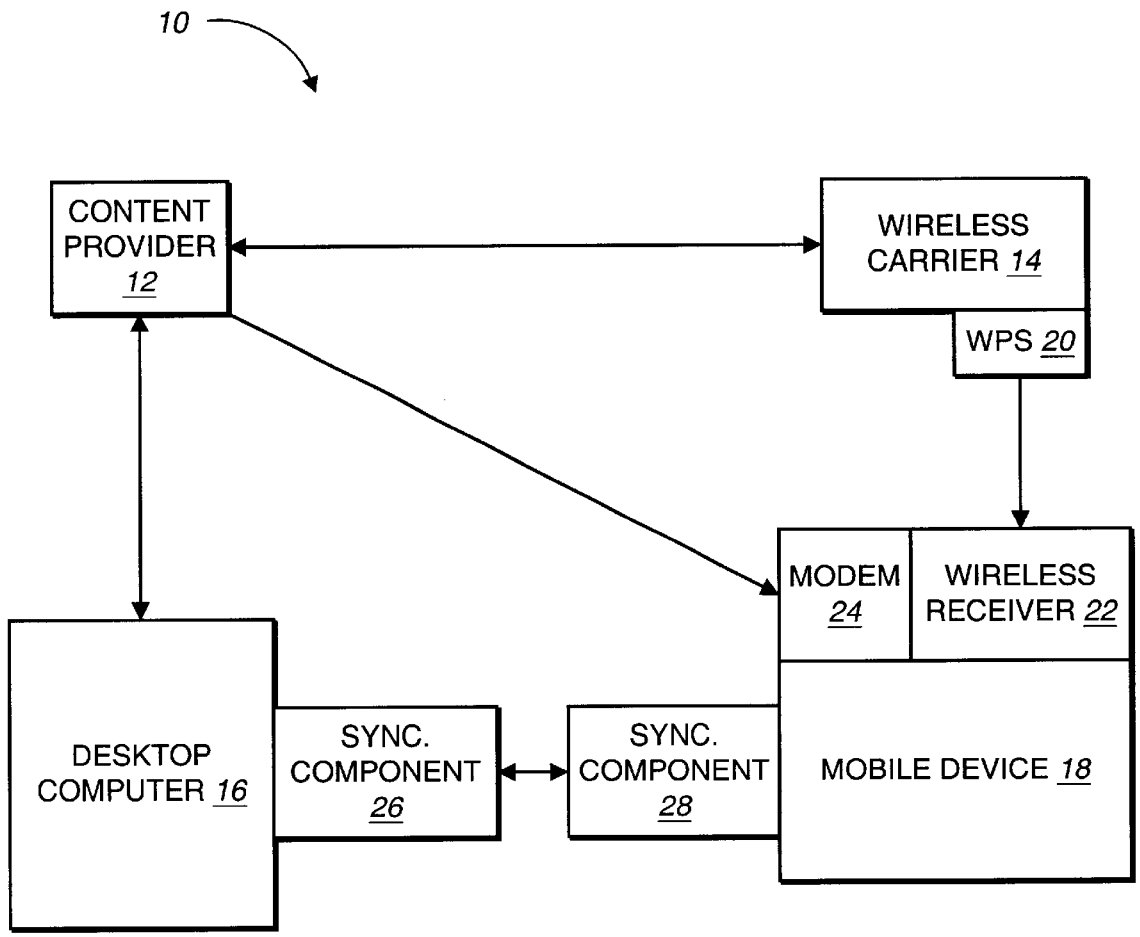
FIG._1

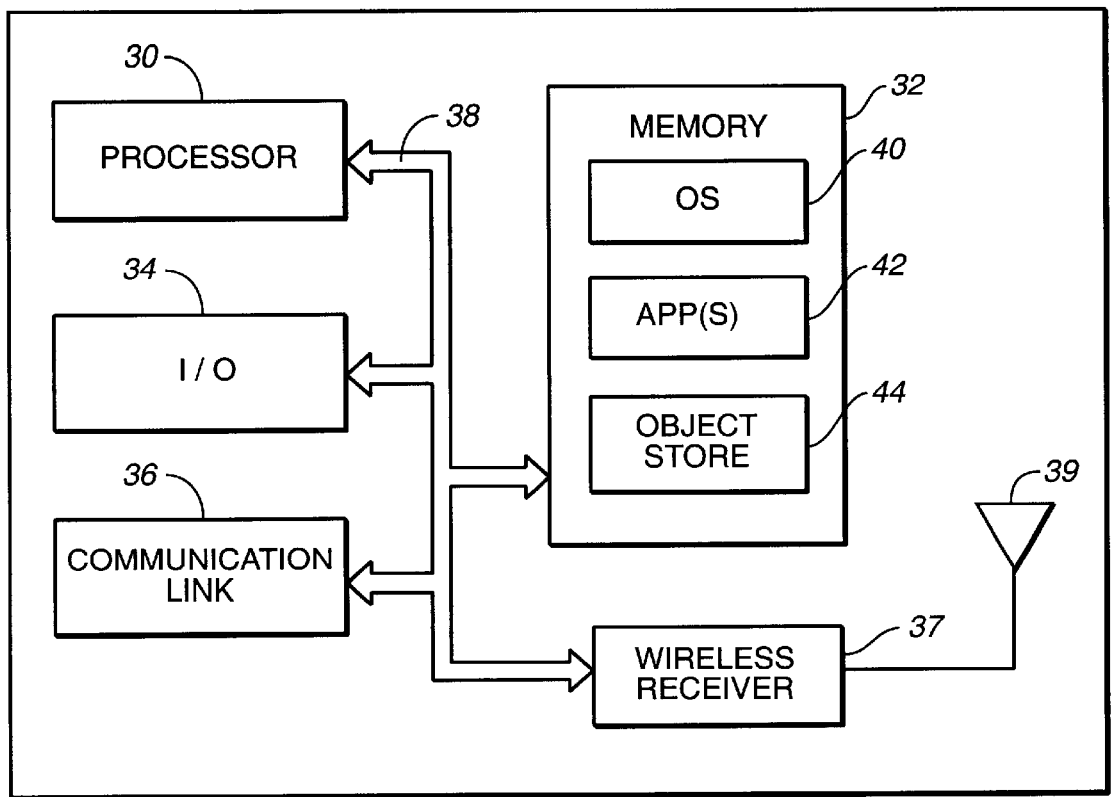
FIG._2
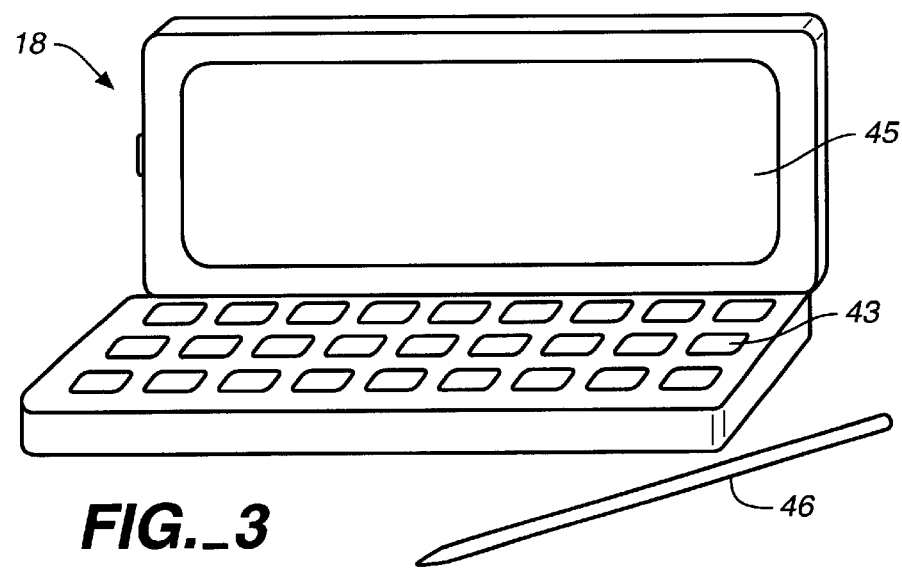
FIG._3

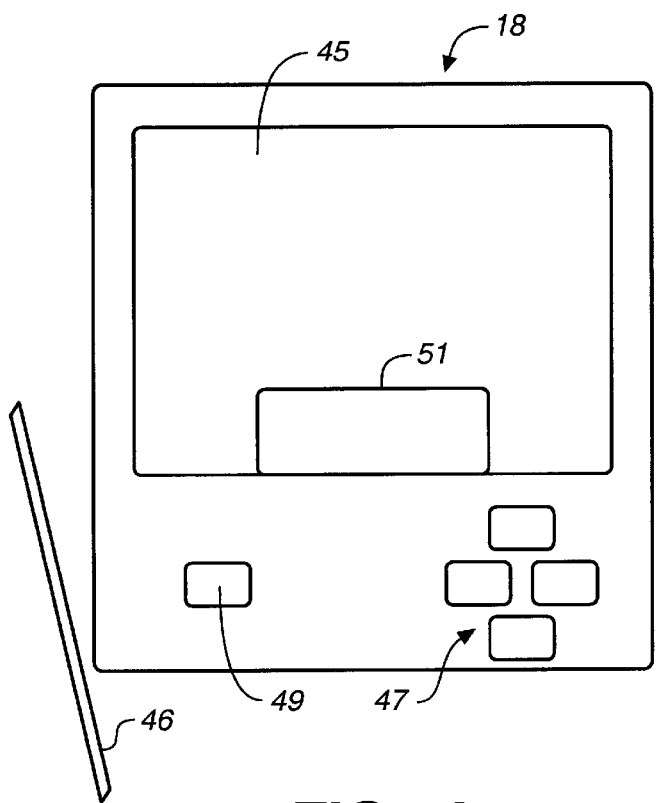
FIG._4
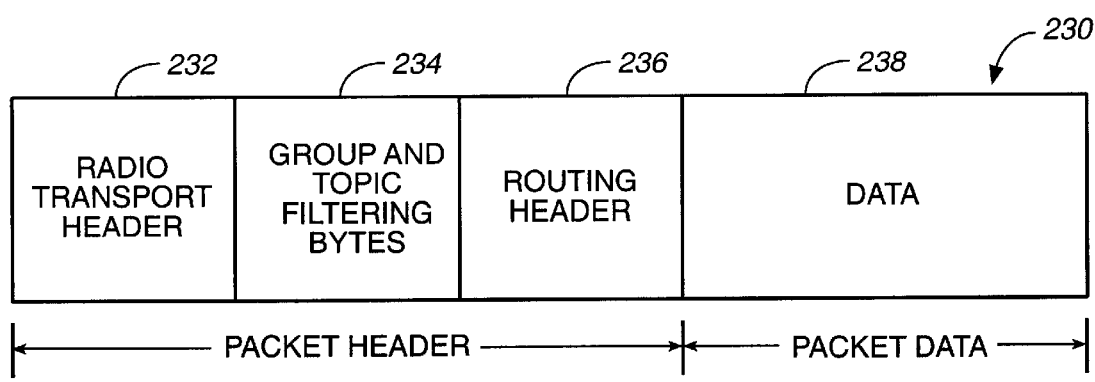
FIG._7

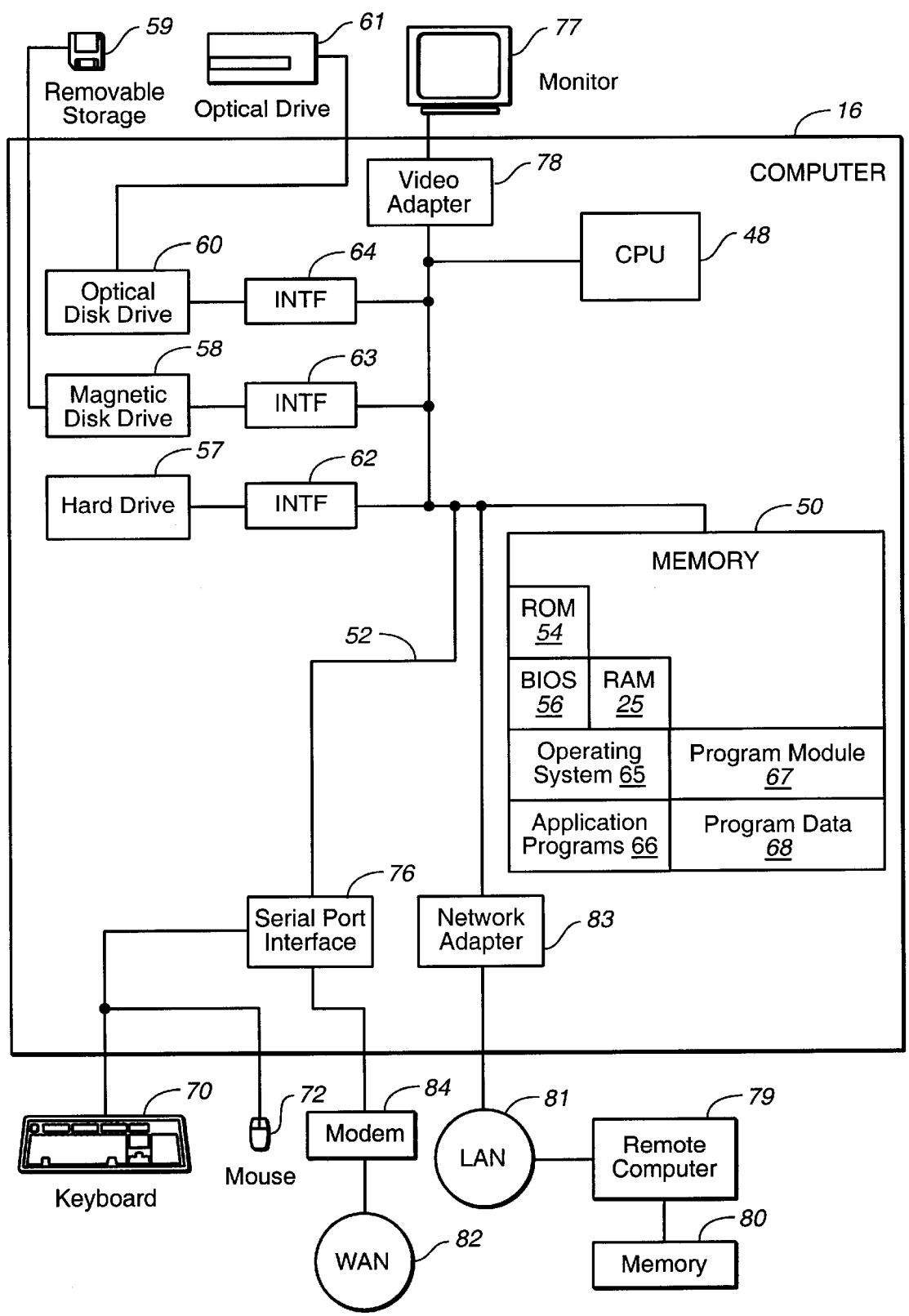
FIG._5

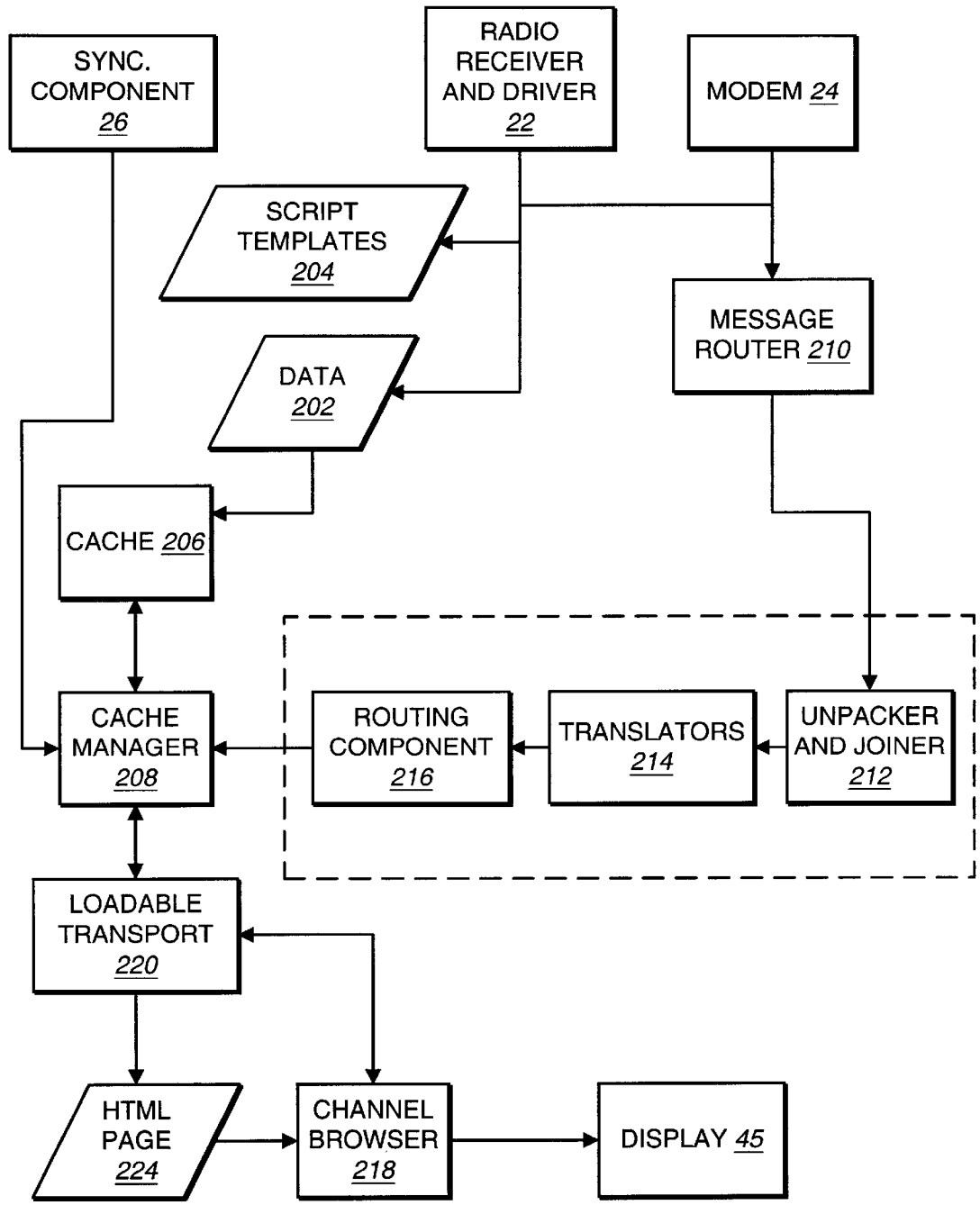
FIG._6

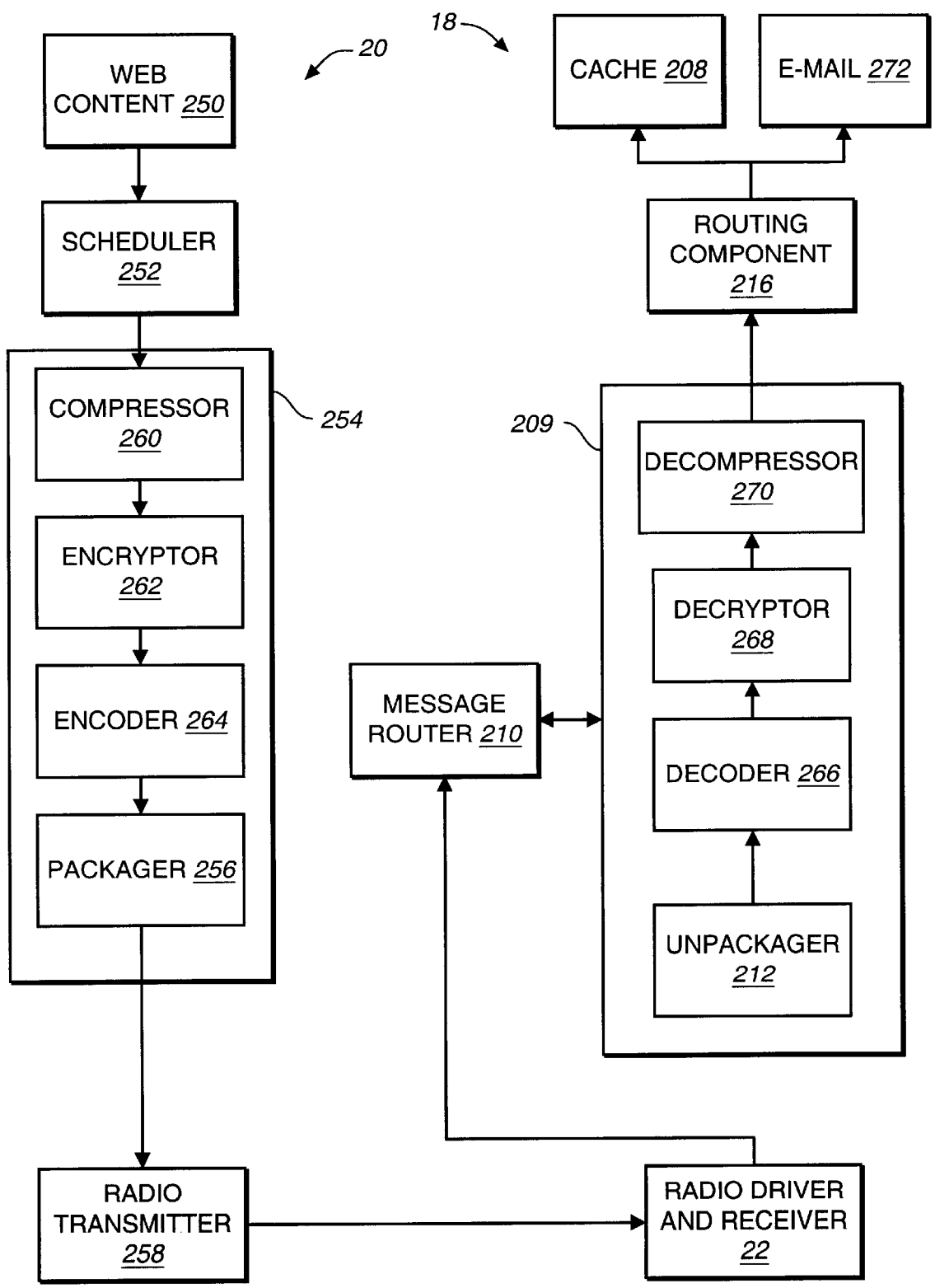
FIG._8

SYSTEM FOR DELIVERING DATA CONTENT OVER A LOW BIT RATE TRANSMISSION CHANNEL

CROSS-REFERENCE TO RELATED APPLICATION

Reference is hereby made to co-pending U.S. patent applications Ser. No. 09/107,941, filed on date herewith, entitled CHANNEL DEFINITION ARCHITECTURE EXTENSION, Ser. No. 09/107,899, entitled SYSTEM FOR EFFICIENT ROUTING AND TRANSLATION OF DATA, filed on date herewith; and Ser. No. 09/059,540, entitled COMPRESSION INTO ARBITRARY CHARACTER SETS, filed on Apr. 13, 1998, all of which have been assigned to the same assignee as the present invention and are fully incorporated by reference herein.

The present application is based on a provisional application Ser. No. 60/070,720 filed on Jan. 7, 1998 and provisional application Ser. No. 60/075,123 filed on Feb. 13, 1998.

BACKGROUND OF THE INVENTION

The present invention relates to personal mobile computing devices commonly known as mobile devices. More particularly, the present invention relates to a system and method for delivering and receiving information on a mobile device.

Mobile devices are small electronic computing devices often referred to as personal digital assistants. Many such mobile devices are hand held devices, or palm-size devices, which comfortably fit within the hand. One commercially available mobile device is sold under the trade name Hand-Held PC (or H/PC) having software provided by Microsoft Corporation of Redmond, Wash.

Generally, the mobile device includes a processor, random access memory (RAM), and an input device such as a keyboard and a display. The keyboard can be integrated with the display, such as where the keyboard is incorporated as a touch sensitive display. A communication interface is optionally provided and is commonly used to communicate with a desktop computer. A replaceable or rechargeable battery powers the mobile device. Optionally, the mobile device can receive power from an external power source that overrides or recharges the built-in battery.

In some prior applications, the mobile device is used in conjunction with a desktop computer. For example, the user of the mobile device may also have access to, and use, a desktop computer at work or at home, or both. The user typically rung the same types of applications on both the desktop computer and on the mobile device. Thus, it is quite advantageous for the mobile device to be designed to be coupled to the desktop computer to exchange information with, and share information with, the desktop computer.

Another technique for providing information to such mobile devices is through a wireless transmission link. Such information can include electronic mail or news, weather, sports, traffic and local event information. The information is typically obtained from a desktop computer connected to the Internet and delivered over a wired connection. However, it may be desirable to deliver such information over a wireless connection as well. A wireless receiver on the mobile device can act to receive information as it is being sent to the mobile device.

There is presently no reasonable way to deliver push style content (such as hypertext mark-up language (HTML) content provided on a global network such as the internet and world wide web) to such devices in a wireless manner and in an open and available architecture. The bit rate of conventional wireless channels is very low. Thus, the delivery of very large content (such as HDML content) is highly impractical.

One conventional type of approach to delivering such information is to rewrite the content into a device friendly format, such as HTML. The content is then obtained over a pull-style model. Another approach currently being used to deliver information via a wireless medium is a closed model. In a closed model, a content provider Can only provide content which is written in a format suitable for receipt by a specific device implementing a specific type of software. This means that the vast majority of web content is unavailable for viewing on such devices.

SUMMARY OF THE INVENTION

The present invention provides a system by which information content is delivered to a mobile device. The web content is divided into data and script information. The script information is used to operate on the data to render the data in a predetermined format.

BRIEF DESCRIPTION OF THE DRAWINGS

FIG. 1 is a simplified block diagram illustrating one embodiment of a mobile device in a system in accordance with the present invention.

FIG. 2 is a more detailed block diagram of one embodiment of a mobile device shown in FIG. 1.

FIG. 3 is a simplified pictorial illustration of one emboidment of the mobile device shown in FIG. 2.

FIG. 4 is a simplified pictorial illustration of another embodiment of the mobile device shown in FIG. 2.

FIG. 5 is a block diagram of one embodiment of a desktop computer in accordance with one aspect of the present invention.

FIG. 6 is a flow diagram illustrating the operation of a mobile device in accordance with one aspect of the present invention.

FIG. 7 illustrates a general data structure of a packet transmitted to the mobile device in accordance with one aspect of the present invention.

FIG. 8 is a more detailed flow diagram illustrating a routing and translator layer and the preparation of packets for transmission in accordance with one aspect of the present invention.

DETAILED DESCRIPTION OF THE PREFERRED EMBODIMENTS

FIG. 1 illustrates a system 10 in which the present invention is illustratively implemented. System 10 includes content provider 12, wireless carrier 14, desktop computer 16 and mobile device 18. Content provider 12 provides any suitable type of data from a database or other data source. For example, content provider 12 is discussed hereinafter as a provider of internet world wide web content. In the preferred embodiment, the content is provided in a standard format, such as HTML, JPEG, GIF, WAV, etc. The web content is also preferably described in a channel definition format (CDF) file. A single portion of content (such as a web page or a web site) is referred to herein as a mobile channel.

A mobile channel is a self describing web site that contains all the information necessary for efficient download of web content to mobile device 18. Three components are provided in a preferable mobile channel. The components include a channel definition format (CDF) file, a set of script files to render the channel, and a set of data files to be rendered. The CDF files are described in greater detail in co-pending U.S. patent application Ser. No. 09/107,941, entitled CHANNEL DEFINITION ARCHITECTURE EXTENSION, and hereby fully incorporated by reference. Briefly, the CDF is an inventory of content contained on the mobile channel.

The script files contain script which defines templates which specify the appearance of the data on the screen of mobile device 18. Scripts are preferably written in visual basic script (VBS).

The data files correspond to one or more script files and include data which is indicative of the substantive content of the channel to be rendered. The data is packaged in small and simple text files. All of this information is used to define web content.

Wireless carrier 14 is described in greater detail later in the application. Briefly, however, wireless carrier 14 is configured to receive web content from the web content provider 12 via dial-up or direct internet connection, or a network connection. Wireless carrier 14 also includes a wireless push server 20. Server 20 splits the content received from content provider 12 into pieces which are compatible with the particular type of transport being used by wireless carrier 14. For instance, server 20 may split the data such that it conforms to maximum packet size constraints, character set requirements, etc. for the channel type or transport type being used. Prior to transmission, the data is preferably translated to a different form. As is described in greater detail later in the application, such translation may include compression, encryption, encoding and then packaging. Once the data has been split appropriately such that it conforms to the transport constraints, the data is then configured for transmission over the air through a wireless network (such as through a paging channel) to be received directly on mobile device 18. The transmitted data is received by a wireless receiver and driver component 22 on mobile device 18 where the data is prepared for use by mobile device 18.

Mobile device 18 also preferably includes a modem 24. Thus, rather than being transmitted through wireless carrier 14, the web content can be transmitted directly from web content provider 12 through a direct dial-up modem connection to mobile device 18.

Desktop computer 16 will also be described in greater detail later in the specification. Briefly, however, desktop computer 16 is preferably provided with a standard web browser, such as Internet Explorer 4.0 commercially available from the Microsoft Corporation of Redmond, Wash. That being the case, the users of desktop 16 can preferably subscribe to channels in a standard fashion which provide the user with certain channel content which can be browsed off-line or on-line. Desktop computer 16 is preferably provided with a loadable transport (in accordance with one aspect of the present invention) that accesses the script files and acts on the corresponding data file (in accordance with the script) to render the content where desktop computer 16 renders the data. Desktop computer 16, through the transport, can periodically retrieve or receive new and updated script, data and CDF files either for further transmission to mobile device 18 or simply for rendering the data. The script, data and CDF files can be transmitted either together or independently of one another. Since scripting files typically need updating much less frequently than the data files, this provides the user with the ability to view the web content on the desktop (off-line) while requiring only small amounts of bandwidth for incremental updating of the data files.

Desktop computer 16 also preferably includes synchronization component 26. Briefly, synchronization component 26 is configured to interact with a similar synchronization component 28 on mobile device 18 such that files which are the subject of synchronization can be synchronized from desktop computer 16 to mobile device 18, or vice versa. Once synchronized, both files (those on computer 16 and mobile device 18) contain up to date information.

More specifically, mobile device 18, in the preferred embodiment, can be synchronized with either desktop computer 16, or another mobile device 18, or both. In that instance, properties of objects stored in an object store on mobile device 18 are similar to properties of other instances of the same object stored in an object store on desktop computer 16 or another mobile device 18. Thus, for example, when a user changes one instance of an object stored in an object store on desktop computer 16, the second instance of that object in the object store of mobile device 18 is updated the next time mobile device 18 is connected to desktop computer 16 so that both instances of the same object contain up-to-date data. This is referred to as synchronization.

In order to accomplish synchronization, synchronization components 26 and 28 run on both mobile device 18 and desktop computer 16 (or another mobile device 18). The synchronization components communicate with one another through well defined interfaces to manage communication and synchronization.

Mobile device 18 is also preferably provided with a script interpreter which, in one preferred embodiment, is the same as or similar to the loadable transport on desktop computer 16. Such a transport may be, for example, a down-sized visual basic interpreter, which receives and interprets the formatting script. The script is associated with a certain data file (typically a text file) that holds the raw data for the web content. Thus, the script interpreter operates on the data associated with a given script to provide a rendering of the web content to the user of mobile device 18.

By separating the script from the data in the web content, web content can be transmitted to mobile device 18 over very low bit rate channels. The script will only typically need to be transmitted very infrequently. Also, since an individual file is typically much smaller than the script files, the data can be updated quite frequently, giving the user of mobile device 18 updated web content information, without transmitting new script. Thus, the separation of the script and data allows the transmission of web content information in a very efficient manner over low bit rate channels.

It is worth noting that, in the preferred embodiment, while mobile device 18 can be coupled to desktop computer 16, it can be also coupled to another mobile device 18. This connection can be made using any suitable, and commercially available, communication link and using a suitable communications protocol. For instance, in one preferred embodiment, mobile device 18 communicates with either desktop computer 16 or another mobile device 18 with a physical cable which communicates using a serial communications protocol. Other communication mechanisms are also contemplated by the present invention, such as infra-red (IR) communication or other suitable communication mechanisms.

FIG. 2 is a more detailed block diagram of mobile device 18. Mobile device 18 preferably includes microprocessor 30, memory 32, input/output (I/O) components 34, desktop communication interface 36 wireless receiver 37 and antenna 39. In a preferred embodiment, these components of mobile 10 are coupled for communication with one another over a suitable bus 38.

Memory 32 is preferably implemented as non-volatile electronic memory such as random access memory (RAM) with a battery back-up module (not shown) such that information stored in memory 32 is not lost when the general power to mobile device 18 is shut down. A portion of memory 32 is preferably allocated as addressable memory for program execution, while another portion of memory 32 is preferably used for storage, such as to simulate storage on a disc drive.

Memory 32 includes operating system 40, an application program 42 (such as a personal information manager or PIM) as well as an object store 44. During operation, operating system 40 is preferably executed by processor 30 from memory 32. Operating system 40, in one preferred embodiment, is a Windows CE brand operating system commercially available from Microsoft Corporation. The operating system 40 is preferably designed for mobile devices, and implements database features which can be utilized by PIM 42 through a set of exposed application programming interfaces and methods. The objects in object store 44 are preferably maintained by PIM 42 and operating system 40, at least partially in response to calls to the exposed application programming interfaces and methods.

I/O components 34, in one preferred embodiment, are provided to facilitate input and output operations from a user of mobile device 18. I/O components 34 are described in greater detail with respect to FIGS. 3 and 4.

Desktop communication interface 36 is optionally provided as any suitable communication interface. Interface 36 is preferably used to communicate with desktop computer 16, content provider 12, wireless carrier 14 and optionally another mobile device 18, as described with respect to FIG. 1. Thus, communication interface 36 preferably includes synchronization components 28 for communicating with desktop computer 16 and modem 24 for communicating with content provider 12. Wireless receiver and driver 22 are used for communicating with wireless carrier 14.

FIG. 3 is a simplified pictorial illustration of one preferred embodiment of a mobile device 10 which can be used in accordance with the present invention. Mobile device 10, as illustrated in FIG. 3, can be a desktop assistant sold under the designation H/PC having software provided by the Microsoft Corporation. In one preferred embodiment, mobile device 18 includes a miniaturized keyboard 43, display 45 and stylus 46. In the embodiment shown in FIG. 3, display 45 is a liquid crystal display (LCD) which uses a contact sensitive display screen in conjunction with stylus 46. Stylus 46 is used to press or contact the display 45 at designated coordinates to accomplish certain user input functions. Miniaturized keyboard 43 is preferably implemented as a miniaturized alpha-numeric keyboard, with any suitable and desired function keys which are also provided for accomplishing certain user input functions.

FIG. 4 is another simplified pictorial illustration of the mobile device 18 in accordance with another preferred embodiment of the present invention. Mobile device 18, as illustrated in FIG. 4, includes some items which are similar to those described with respect to FIG. 3, and are similarly numbered. For instance, mobile device 18, as shown in FIG. 4, also includes touch sensitive screen 45 which can be used, in conjunction with stylus 46, to accomplish certain user input functions. It should be noted that the display 45 for the mobile device as shown in FIGS. 3 and 4 can be the same size as one another, or different sizes from one another, but would typically be much smaller than a conventional display used with a desktop computer. For example, displays 45 shown in FIGS. 3 and 4 may be defined by a matrix of only 240×320 coordinates, or 160×160 coordinates, or any other suitable size.

The mobile device 18 shown in FIG. 4 also includes a number of user input keys or buttons (such as scroll buttons 47) which allow the user to scroll through menu options or other display options which are displayed on display 45, or which allow the user to change applications, without contacting display 45. In addition, the mobile device 18 also shown in FIG. 4 also preferably includes a power button 49 which can be used to turn on and off the general power to the mobile device 18.

It should also be noted that, in the embodiment illustrated in FIG. 4, mobile device 18 includes a hand writing area 51. Hand writing area 51 can be used in conjunction with stylus 46 such that the user can write messages which are stored in memory 42 for later use by the mobile device 18. In one illustrative embodiment, the hand written messages are simply stored in hand written form and can be recalled by the user and displayed on the display screen 45 such that the user can review the hand written messages entered into the mobile device 18. In another preferred embodiment, mobile device 18 is provided with a character recognition module such that the user can enter alpha-numeric information into mobile device 18 by writing that alpha-numeric information on area 51 with stylus 46. In that instance, character recognition module in the mobile device 18 recognizes the alpha-numeric characters and converts the characters into computer recognizable alpha-numeric characters which can be used by the application programs 42 in mobile device 18.

FIG. 5 and the related discussion are intended to provide a brief, general description of a suitable desktop computer 16 in which portions of the invention may be implemented. Although not required, the invention will be described, at least in part, in the general context of computer-executable instructions, such as program modules, being executed by a personal computer 16 or mobile device 18. Generally, program modules include routine programs, objects, components, data structures, etc. that perform particular tasks or implement particular abstract data types. Moreover, those skilled in the art will appreciate that desktop computer 16 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing desktop computer 16 includes a general purpose computing device in the form of a conventional personal computer 16, including processing unit 48, a system memory 50, and a system bus 52 that couples various system components including the system memory 50 to the processing unit 48. The system bus 52 may be any of several types of bus structures including a memory bus or memory controller, a peripheral bus, and a local bus using any of a variety of bus architectures. The system memory 50 includes read only memory (ROM) 54 a random access memory (RAM) 55. A basic input/output system (BIOS) 56, containing the basic routine that helps to transfer information between elements within the desktop computer 16, such as during start-up, is stored in ROM 54. The desktop computer 16 further includes a hard disk drive 57 for reading from and writing to a hard disk (not shown) a magnetic disk drive 58 for reading from or writing to removable magnetic disk 59, and an optical disk drive 60 for reading from or writing to a removable optical disk 61 such as a CD ROM or other optical media. The hard disk drive 57, magnetic disk drive 58, and optical disk drive 60 are connected to the system bus 52 by a hard disk drive interface 62, magnetic disk drive interface 63, and an optical drive interface 64, respectively. The drives and the associated computer-readable media provide non-volatile storage of computer readable instructions, data structures, program modules and other data for the desktop computer 16.

Although the exemplary environment described herein employs a hard disk, a removable magnetic disk 59 and a removable optical disk 61, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, magnetic disk 59, optical disk 61, ROM 54 or RAM 55, including an operating system 65, one or more application programs 66 (which may include PIMs), other program modules 67 (which may include synchronization component 26), and program data 68. A user may enter commands and information into the desktop computer 16 through input devices such as a keyboard 70, pointing device 72 and microphone 74. Other input devices (not shown) may include a joystick, game pad, satellite dish, scanner, or the like. These and other input devices are often connected to the processing unit 48 through a serial port interface 76 that is coupled to the system bus 52, but may be connected by other interfaces, such as a sound card, a parallel port, game port or a universal serial bus (USB). A monitor 77 or other type of display device is also connected to the system bus 52 via an interface, such as a video adapter 78. In addition to the monitor 77, desktop computers may typically include other peripheral output devices such as speaker 75 and printers.

The desktop computer 16 may operate in a networked environment using logic connections to one or more remote computers (other than mobile device 18), such as a remote computer 79. The remote computer 79 may be another personal computer, a server, a router, a network PC, a peer device or other network node, and typically includes many or all of the elements described above relative to desktop computer 16, although only a memory storage device 80 has been illustrated in FIG 4. The logic connections depicted in FIG. 4 include a local area network (LAN) 81 and a wide area network (WAN) 82. Such networking environments are commonplace in offices, enterprise-wide computer network intranets and the Internet.

When used in a LAN networking environment, the desktop computer 16 is connected to the local area network 81 through a network interface or adapter 83. When used in a WAN networking environment, the desktop computer 16 typically includes a modem 84 or other means for establishing communications over the wide area network 82, such as the Internet. The modem 84, which may be internal or external, is connected to the system bus 52 via the serial port interface 76. In a network environment, program modules depicted relative to desktop computer 16, or portions thereof, may be stored in the remote memory storage devices. It will be appreciated that the network connections shown are exemplary and other means of establishing a communications link between the computers may be used.

Desktop computer 16 runs operating system 65 that is typically stored in non-volatile memory 54 and executes on the processor 48. One suitable operating system is a Windows brand operating system sold by Microsoft Corporation, such as Windows 95 or Windows NT, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y. Application programs are preferably stored in program module 67, in volatile memory or non-volatile memory, or can be loaded into any of the components shown in FIG. 5 from a floppy diskette 59, CDROM drive 61, downloaded from a network via network adapter 83, or loaded using another suitable mechanism.

A dynamically linked library (DLL), comprising a plurality of executable functions is associated with PIMs in the memory for execution by processor 48. Interprocessor and intercomponent calls are facilitated using the component object model (COM) as is common in programs written for Microsoft Windows brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLL associated with the particular PIM is designed specifically to work in conjunction with that PIM and to expose desktop synchronization interfaces that function as described in more detail above according to a synchronization protocol. The DLL, in turn, calls interfaces exposed by the PIM in order to access data representing individual properties of objects maintained in an object store. The object store 6, of course, can reside in any one of the suitable memory components described with respect to FIG. 4.

ARCHITECTURE BLOCK DIAGRAM

FIG. 6 is a block diagram illustrating the functional architecture of mobile device 18. FIG. 6 shows similar items to those previously shown in the specification. Similar items are similarly numbered. FIG. 6 illustrates that mobile device 18 receives web content information either via synchronization component 26, wireless receiver (radio receiver and driver) 22 or modem 24. In any of those cases, the CDF files as well as the script templates and data files, indicated by blocks 202 and 204 are eventually provided to cache memory 206. Where the web content information is received through synchronization component 26, the script templates and data files may are not be encrypted or encoded or otherwise formatted in the same fashion as they are for transmission over a wireless or modem channel. Therefore, the script templates 204 and data files 202 are provided directly to cache manager 208. Cache manager 208 receives the script templates and data files and provides them to cache memory 206. Cache manager 208 includes memory manipulation and timing components as well as data transfer components, which are suitable for transferring the script templates and data files to a particular location in cache memory 206, and to track that location.

If, on the other hand, the web content is received over wireless receiver and driver 22 or modem 24, additional processing steps must be undertaken prior to caching the data. Wireless receiver and driver 22 is a physical layer that receives and filters messages and generates wake-up events to mobile device 18. In one preferred embodiment, as is described later with respect to FIG. 8, the information transmitted is first translated (such as compressed, encrypted, encoded and packaged) before transmission. Thus, the data must be translated back to its original form prior to further use by mobile device 18. Therefore, the data is first provided to message router 210. Message router 210 acts to record the message and route the received message to a translation layer 209. In FIG. 6, translation layer 209 includes unpackager and joiner component 212, a group of additional translators collectively labeled 214 and a further routing component 216.

Unpackager and joiner block 212 acts to receive, unpack and order a group of packets being transmitted. The unpackager rejoins packets of any long messages which were split up by wireless carrier 15. The ordered data is provided to translation components 214.

Translation components 214 act to reformat or translate the data into appropriate form to be handled by content handler 216. For example, once the packets which comprise a message have been unpacked and rejoined by unpacker and joiner 212, translation components 214 may typically decompress, decrypt and decode those packets.

Content handler 216 delivers the unpacked, joined and translated message to the appropriate registered destination (i.e., to the appropriate application or other functional block) on mobile device 18. In the embodiment illustrated in FIG. 5, content handler 216 provides the information to cache manager 208 which stores it in cache 206.

When the user wishes to off-line browse the web content stored in cache 206, the user launches an appropriate application program indicated by channel browser block 218 in FIG. 5. Channel browser 218 preferably generates suitable user interfaces on display 45 which provide the user with the ability to choose a certain channel to be viewed.

Channel browser 218 is configured to interact with a loadable transport 220 which is, in turn, coupled to cache manager 208. In response to the user requesting to view information provided via the chosen channel, loadable transport 220 requests cache manager 208 to retrieve the corresponding web content information (in the form of script templates and data files) from cache 206. The desired script templates 204 and data files 202 are provided from cache manager 208 to loadable transport 220.

The script interpreter in transport 220 is preferably a visual basic script interpreter which interprets script templates 204 and acts on data files 202 to provide a desired rendering of the web content. In the embodiment illustrated in FIG. 5, the web content is rendered as a conventional hypertext mark-up language (HTML) page 224. Loadable transport 220 then provides the HTML page rendering to channel browser 218 for viewing by the user of mobile device 18 on display 45.

INFORMATION LOGGING

One aspect of the present invention enables logging of desired information for use by content provider 12. In other words, by providing an entry in the CDF file, the content providers can tag certain items which they want to track (i.e., they can tag certain items for which they would like to know when, and for how long, those items were viewed by any given user). The present invention implements this functionality.

For example, when the user launches channel browser 218, and requests information from loadable transport 220, loadable transport 220 determines whether the requested information includes the appropriate CDF tag indicating that the content provider wishes to log information regarding the time and duration which the information was viewed. If so, loadable transport 220 logs information which is representative of the time and duration that the information was viewed by the user. This information is stored in cache 206 in a location which corresponds to that particular web content information.

The next time mobile device 18 is synchronized with desktop computer 16, not only is mobile device 18 updated with the current web content received by desktop computer 16, but desktop computer 16 is updated with the current logging information maintained by mobile device 18. Similarly, the next time the browser on desktop computer 16 accesses the appropriate web content from content provider 12, the logging information is transmitted from desktop computer 16 to content provider 12. In one preferred embodiment, since the browser on desktop computer 16 is Internet Explorer 4.0, logging information which has been synchronized to desktop computer 16 is transmitted to content provider 12 when the scheduler of Internet Explorer 4.0 is next invoked on desktop computer 16.

DATA STRUCTURE AND FILTERING

FIG. 7 illustrates one embodiment of a packet of web content data received by radio receiver and driver 10. The radio receiver can preferably receive messages of substantially any format. Many different types of header formats can be defined for receipt by the radio. FIG. 7 gives but one illustrative type of packet format.

Packet 230 preferably includes a plurality of portions, such as radio transport header 232, group and topic filtering bytes 234, routing header 236 and data 238. The radio transport header 232 preferably includes address information. The address information is an identifier used to send a radio message to radio receiver 22 (or any other similar type of radio card). For example, in one common commercially available paging transmission protocol, the address information in radio transport header 232 comprises a capcode. The capcode refers to a storage location on the physical hardware radio card device 22 that stores addressing information. The radio transport header 232, in one preferred embodiment, supports sixteen different addresses. Radio receiver and driver 22 filters and discards any messages which do not match any of the addresses. If a match is observed, then radio receiver 22 has detected a message potentially addressed to it, and must receive and further process the message. The message is then passed to message router 210 which determines, in conjunction with translation layer 209, which components on the mobile device 18 are necessary to process the message.

Group and topic filtering bytes 234 are also preferably provided. A group, as referred to herein, is a subclass of an address that is used in accordance with the present invention to extend the filtering capability of an address. Further, a topic is a subclass of a group, which is also provided to extend the filtering capability of the address and group information.

It should be noted that messages arriving at radio receiver and driver 22 with an appropriate address may not have group and topic filtering bytes 234 pre-appended thereto. If those bytes are present, however, the driver in radio receiver and driver 22 operates to filter the message based on the group and topic filtering bytes.

The driver in radio receiver and driver 22 implements logic which first examines packet 230 to determine whether any group and topic filtering bytes 234 are included in packet 230. In a preferred embodiment, the driver in radio receiver and driver 22 supports a library which includes a function AnalyzeMessage( ). The AnalyzeMessage function isolates service group codes and other information in the incoming message. If group and topic filtering bytes are present, then the group and topic filtering functions must be performed.

In the preferred embodiment, mobile device 18 includes a memory which contains a group table as described in greater detail in the above-incorporated applications. Briefly, the group table contains entries of service groups, each of which can be associated with any suitable address. Also, there can preferably be any suitable number of service groups associated with one address. Thus, in the preferred embodiment, group entries in the group table are sorted by address numbers, then by service group codes. The content of one preferred embodiment of the group table is set out in more detail in the above-referenced application.

If group or topic filtering bytes are detected, then the driver in radio receiver and driver 22 searches the group table to determine whether the service group code detected in packet 230 is listed in the group table, and whether it is active or inactive. If the service group code is not found in the table, or if it is found but it has been deactivated (or disabled) then the driver 22 discards the message and no further processing is done with respect to that message. However, if driver 22 determines that the group and topic filtering bytes 234 are included in the group table, then it is determined that the message was intended for that particular mobile device 18 and further processing continues.

Since all of this group and topic filtering is done at the level of driver 22, it occurs quite low in the protocol stack, or system architecture, of mobile device 18. Thus, filtering occurs early on in the process and the storage space required for the address and message is quite low. In addition, since the driver, itself, performs much of this filtering, the group and topic filtering bytes 234 allow any application running on mobile device 18 to pass correct filtering information down to the group and topic tables for filtering at the level of driver 22. This significantly improves power consumption over previous designs because the messages do not need to be received, processed, and passed all the way up to the application level in the protocol stack, or architecture, of mobile device 18 before being filtered.

TRANSMISSION AND TRANSLATION ARCHITECTURE

FIG. 8 is a more detailed block diagram illustrating the transmission of data packets from wireless push server (WPS) component 20 to mobile device 18. Wireless push server 20 preferably includes web content cache 250, scheduler 252, translation layer 254, packager 256 and radio transmitter 258. Translation layer 254 preferably includes any suitable and desired number of translators. The translators are preferably used to operate on the web content (e.g., the data files, script files and CDF files) and provide the content, in a desired form, to packager 256 of radio transmitter 258 for transmission to mobile device 18. In the embodiment shown in FIG. 8, translation layer 264 includes compressor 260, encrypter 262 and encoder 264.

FIG. 8 also shows a portion of mobile device 18 in greater detail. Similar items are similarly numbered to those shown in FIG. 6. However, FIG. 8 illustrates translator layer 209 in greater detail. Translator layer 209 preferably includes a desired number and type of translators which operate to reverse the translations performed in translator layer 254 on WPS 20. Thus, the embodiment shown in FIG. 8 includes unpackager 212, decoder 266, encrypter 268, and decompressor 270.

In operation, scheduler 252 periodically accesses web content cache 250 to provide updates, or additional web content, to mobile device 18. That information is first provided to translation layer 254. Each translator in translation layer 254 preferably performs the translation operation on the incoming data, and attaches an identifier, such as a header or a tag, to the data output thereby to indicate the type of translation performed. For instance, in the preferred emboidment, a portion of the web content which has been extracted from web content cache 250 by scheduler 252 (and prepared for translation layer 254 by scheduler 252) is first provided to compressor 260. Compressor 260 compresses the blob of information received thereby and attaches a four-byte header to identify the compression scheme used to compress the data. Compression is preferably done before encryption because pure text typically provides better compression than encrypted text.

Encrypter 262 receives the compressed data from compressor 260 and encrypts the output of compressor 260 and also attaches a four byte header to identify the encryption scheme used to encrypt the data. Encrypter 262 then provides encrypted data to encoder 264.

Encoder 264 encodes the output of encrypter 262 to convert the data stream into a stream consisting of characters suitable for transmission over the chosen wireless medium. For example, where the wireless medium is a conventional paging channel, encoder 264 encodes the data into a stream consisting of printable ASCII characters only, so that it may be transmitted over the wireless link. Encoder 264 also attaches a four byte header to the data to identify the particular encoding scheme used to encode the data.

As described in greater detail above, packager 256 splits the output of encoder 264 into smaller packages suitable for transmission over the wireless link. Packager 256 attaches a header in front of the data packet so that the packets can be identified uniquely by the receiver of the information. For example, if the data input to translation layer 254 is first compressed, then encrypted, then encoded, the output of encoder 264 can be represented by:

(Encodingscheme, [EncryptionID {CompressionID, Data}]).

Thus, the packager takes the above data and produces packets generally in the form shown in FIG. 7 and given by:

{Hdr, data}, {Hdr, data} . . . [Hdr, data}

Packager 256 (which can also be viewed as a translator) provides the data and, headers to radio transmitter 258 which transmits the data to radio receiver and driver 22. More specifically, the packager 256 breaks input data from content provider 12 into a number of packets somewhere between approximately 128 and 500 bytes in size depending on the particular carrier. Each packet is sent to a paging gateway (e.g, radio transmitter 258), such as by the internet, e-mail, wireless carrier or via modem. Packets can be sent down the pager channel in any order.

In one preferred embodiment, each record or packet contains 11–23 bytes of packet header information and N-bytes of packet data information generally of the form of packet 230 illustrated in FIG. 7. The radio transport header in the packet header information preferably includes an IP address, a sequence number, a packet number and a number of optional headers (e.g., group and topic filtering bytes 234 and routing header 236).

The IP address is the address of the service provider. The sequence number provides a particular sequence number for a packet stream being transmitted. The IP address and the sequence number (in combination) provide a unique identification to the packet stream and allow a receiver, such as mobile device 18, to assemble multiple packet streams arriving in a multiplex manner.

Radio receiver and driver 22 filters the data, as discussed above, and provides data to be received to router 210. Router 210 examines the header information on each packet. The header information gives router 210 an indication as to which translator needs to be invoked to operate on the data. In the embodiment shown in FIG. 8, the translators 212, 266, 268 and 270 are simply provided in reverse order as translators 256, 260, 262 and 264. The router maintains a table of all available translators in reference to the dynamically linked libraries (DLLs) of those translators. The four byte header or tag is used to locate the appropriate translator. The translator is responsible for removing this tag and dispatching or returning the translated data.

Most of the translators are part of a chain of translators in which the output of the translator can be fed to another translator. This provides flexibility to the content provider since they can alter the sequence of translators to their needs and particular data. However, translators can also be provided which consume the input in the sense that they place the outputs somewhere else in the system and thereby stop the translation chain.

The router continues to apply translators until the article is consumed by one of the terminating translators. In one preferred emboidment, when no remaining tags or headers are found and the article is still not consumed, then the data is passed onto the e-mail inbox 272.

Thus, router 210 obtains a first data packet, provides it to unpackager 212, and receives the unpackaged and joined data back from unpackager 212. Unpacker and joiner 212 stores all received packets and joins them together. It can receive packets out of sequence, receive multiple streams (from different content providers or the same content provider). In sum, the unpackager 212 implements a simple file system where a file comprises the complete data which was sent, before packetization.

The file name is formed of the IP address which is that of the service provider, along with the sequence number which, in addition to indicating a packet stream sequence member, indicates whether this particular packet is the last packet in a sequence being transmitted. The packets are received and stored in an ordered, linked list by unpackager and joiner 212.

Radio receiver and driver 22 receives and buffers a complete page of information. It then passes this page to message router 210 which writes the page to a file. Router 210 then calls unpackager and joiner 212. The packet is appended to a file whose name is derived from the IP address and sequence number combination contained in the given packet. If the file does not yet exist, then it is created new by unpackager 212.

When the packet marked as last packet is received, then unpackager 212 knows how many packets to expect. Recall that the last packet need not arrive temporally last. Unpackager 212 counts the number of packets already received and stores the number of packets it expects in a counter. Each time a non-duplicate packet is appended, the counter is decremented. When it falls to zero, all packets have been received. The unpackager 212 then marches through the index file which it has created, and which contains a time stamp indicative of the order of the packets received. The unpackager creates a data file in correct sequence and passes the data file on for further processing.

As soon as all packets have arrived, the data file containing the ordered linked list is removed from the file system in unpackager 212 and is passed either on to additional translators in translation layer 209 or back to router 210.

In order to deal with lost, duplicate, and erroneous packets, a checksum error detection method using cyclic redundancy code-32 (CRC-32) method is implemented over the entire file of data bytes (i.e., it excludes all header bytes).

In order to detect lost packets, the time stamp of the last packet received in the index file is recorded. Unpackager 212 checks this time stamp each time it processes a packet for the present data file, or for any other data file. If the time difference between a current time and the time of the last packet received is over a desired number of minutes (or any other suitable time interval), it is assumed that any remaining packets for the data file have been lost and the data file is deleted.

Duplicate packets are detected by referencing the index file which will already have an initialized entry for that packet. Two options can be implemented in dealing with duplicate packets. First, the new packet can be discarded and the old one retained. Second, the new packet can be appended to the data file by overwriting the index entry for the first (or old) packet. This will have the effect of discarding the old packet.

In any case, to conclude the example provided in FIG. 8, once the packets have been unpacked and joined, router 210 examines the headers on the data to find that the data must first be provided to decoder 266. Decoder 266 decodes the data and provides it back to router 210. The next header on the data is examined by router 210 and indicates that the data needs to be provided to decrypter 268. Decrypter 268 decrypts the data and then returns it to router 210. Router 210 then provides the data to decompressor 270, based on the header information remaining with the decrypted data. Decompressor 270 decompresses the data and either returns it to router 210 or provides it to router component 216 which identifies the particular destination for the data. In the preferred embodiment, routing component 216 is coupled to web content cache 208 and e-mail inbox 272. Of course, other destinations can also be provided.

One specific implementation of a translator, along with a more detailed description of illustrative compression, encryption and encoding translators is provided in the above-referenced co-pending U.S. patent applications, which are hereby fully incorporated by reference, as well as Appendix A hereto.

Thus, by separating the content into separate script template and data files, the present invention provides the ability to deliver content to a mobile device over a low bit rate channel in an economic and efficient manner. Small segments of data can be delivered instead of full HTML pages. The present invention also provides a mechanism by which logging and filtering can be accomplished in an efficient manner.

Although the present invention has been described with reference to preferred embodiments, workers skilled in the art will recognize that changes may be made in form and detail without departing from the spirit and scope of the invention.

What is claimed is:

1. A system for providing information content from a content provider to a mobile device, comprising:
   a provider component including:
      a first store storing the content as a data file and a corresponding independent script file, the data file including data indicative of the content to be rendered and the script file including a script indicative of a desired appearance which the substantive data is to take upon being rendered, wherein the script file and the data file are transmittable independently of one another;
      a transmitter coupleable to the first data store and configured to transmit the content to the mobile device; and
   a mobile device component, disposed on the mobile device, including:
      a receiver configured to receive the content from the transmitter;
      a second store;
      a router coupled to the receiver and the second store and configured to provide the script file and the data file to the second store; and
      a transport coupled to the second store and configured to selectively retrieve the data file and execute the script to place the data in the desired rendering form.

2. The system of claim 1 wherein the provider component comprises:
   a first translator layer coupled to the first store and configured to retrieve the data file and the script file and translate the data and script form an untranslated form to a translated form.

3. The system of claim 2 wherein the mobile device component comprises:
   a second translator layer coupled to the receiver and configured to translate the data and script from the translated form to the untranslated form.

4. The system of claim 3 wherein the first translator layer comprises a compressor configured to compress the data and script from an uncompressed form to a compressed form and wherein the second translator layer comprises a decompressor coupled to the receiver and configured to decompress the data and script from the compressed form the the decompressed form.

5. The system of claim 3 wherein the first translator layer comprises an encryptor configured to encrypt the script and data and wherein the second translator layer comprises a decryptor configured to decrypt the data and the script.

6. The system of claim 3 wherein the first translator layer comprises an encoder configured to encode the script and data and wherein the second translator layer comprises a decoder configured to decode the script and data.

7. The system of claim 3 wherein the first translation layer comprises a packager configured to divide the script and data into portions and translate the portions into packets suitable for transmission and wherein the second translation layer comprises an unpackager configured to untranslate and assemble the packets.

8. The system of claim 3 wherein the first translator layer is configured to provide tag information indicative of translation operations performed on the script and data and to provide the tag information along with the script and data in the translated form and wherein the second translator layer is configured to perform translation operations on the script and data based on the tag information.

9. The system of claim 1 wherein the transmitter comprises:
   a wireless transmitter for transmitting the content over a wireless transmission link and wherein the receiver comprises a wireless receiver configured to receive the content over the wireless transmission link.

10. The system of claim 1 and further comprising:
   a desktop computer selectively coupleable to the provider component and including a retrieval component configured to retrieve the data file and the script file, the transmitter comprising a synchronization component on the desktop computer configured to be selectively coupleable to the mobile device.

11. The system of claim 10 wherein the receiver comprises:
   a synchronization component on the mobile device selectively coupleable to the synchronization component on the desktop computer, wherein the synchronization component on the desktop computer and the synchronization component on the mobile device are configured to selectively synchronize the script file and the data file to the mobile device.

12. The system of claim 11 wherein the first store includes a definition file describing characteristics of the information content including a logging characteristic and wherein the transport logs rendering information indicative of rendering of the information content on the mobile device.

13. The system of claim 12 wherein the synchronization component on the mobile device is configured to synchronize the rendering information to the desktop computer and wherein the retrieval component is configured to provide the rendering information to the provider component.

14. The system of claim 13 wherein the rendering information includes a rendering count indicative of a number of times the information content is rendered on the mobile device and a rendering duration indicative of a duration for which the information content is rendered on the mobile device.

15. The system of claim 10 wherein the provider component further comprises:
   a wireless transmitter for transmitting the content over a wireless transmission link and wherein the receiver further comprises a wireless receiver configured to receive the content over the wireless transmission link.

16. The system of claim 1 wherein the information content comprises information rendered using a processor-independent language.

17. The system of claim 16 wherein the information content comprises information rendered using hypertext mark-up language (HTML).

18. The system of claim 3 wherein the first translation layer provides the script and data, in the translated form, with a plurality of separate filtering segments, the receiver on the mobile device selectively receiving and discarding the script and data based on a first of the plurality of filtering segments, and the second translation layer selectively receiving and discarding the script and data based on a second of the plurality of filtering segments.

19. The system of claim 18 wherein the information content comprises group information and topic information on a subscribable channel, wherein the second of the plurality of filtering segments includes a first filtering portion corresponding to the group information and a second filtering portion corresponding to the topic information and wherein the second translation layer filters based on the group and topic filtering portions independently of one another.

20. A computer readable medium including instructions readable by a mobile device which, when implemented, cause the mobile device to handle information by performing steps comprising:

intermittently receiving a data file and a corresponding script file, the data file including data indicative of substantive information and the script file including script information indicative of a desired appearance which the substantive data is to take upon being rendered, the data file and corresponding script file being independently receivable by the mobile device;

storing the script file and data file; and retrieving the data from the data file and executing the script in the corresponding script file to render the data.

21. The computer readable medium of claim 20 including instructions readable by a mobile device which, when implemented, cause the mobile device to handle information by performing steps comprising:

intermittently receiving an updated data file including updated data; and executing the script in the corresponding script file, already stored on the mobile device, to render the updated data.

22. The computer readable medium of claim 21 wherein the step of executing the script in the corresponding script file, already on the mobile device, is performed in response to receiving the updated data.

23. The computer readable medium of claim 22 wherein executing the script comprises:

rendering the data in a processor independent form.

24. The computer readable medium of claim 23 wherein executing the script comprises:

rendering the data in hypertext mark-up language (HTML) form.

25. The computer readable medium of claim 20 further including instructions readable by a mobile device which, when implemented, cause the mobile device to handle information by perform steps comprising:

intermittently receiving an updated script file including updated script; and executing the updated script on data in the corresponding data file, already stored on the mobile device, to render the data according to the updated script.

26. The computer readable medium of claim 21 wherein the data file and corresponding script file are received in a translated form and further including instructions readable by a mobile device which, when implemented, cause the mobile device to handle information by performing steps comprising:

untranslating the data file and script file into an untranslated form.

27. The computer readable medium of claim 20 further including instructions readable by a mobile device which, when implemented, cause the mobile device to handle information by performing steps comprising:

intermittently receiving additional script files including additional script; and intermittently receiving additional data files, corresponding to the additional script files and including additional data.

28. The computer readable medium of claim 27 further including instructions readable by a mobile device which, when implemented, cause the mobile device to handle information by performing steps comprising:

executing the additional script in the additional script files on data in the corresponding additional data files to render the additional data according to the additional script.

29. The computer readable medium of claim 20 further including instructions readable by a mobile device which, when implemented, cause the mobile device to handle information by performing steps comprising:

logging rendering data based on rendering of the information.

30. The computer readable medium of claim 29 further including instructions readable by a mobile device which, when implemented, cause the mobile device to handle information by performing steps comprising:

synchronizing the rendering data to a desktop computer.

31. The computer readable medium of claim 20 further including instructions readable by a mobile device which, when implemented, cause the mobile device to handle information by performing steps comprising:

receiving the script file and data file with a plurality of separate filtering segments; and selectively receiving and discarding the script and data based on the plurality of filtering segments.

32. The computer readable medium of claim 31 wherein the information content comprises group information and topic information on a subscribable channel, and further including instructions readable by a mobile device which, when implemented, cause the mobile device to handle information by performing steps comprising:

selectively receiving and discarding the script and data based on a first filtering portion corresponding to the group information and a second filtering portion corresponding to the topic information, wherein the filtering is based on the group and topic filtering portions independently of one another.

33. A mobile device, comprising:

a receiver configured to intermittently receive a data file and a corresponding script file, the data file including data indicative of substantive information and the script file including script information indicative of a desired appearance which the substantive data is to take upon being rendered, the data file and corresponding script file being independently receivable by the mobile device;

a memory rendering component storing the script file and data file; and retrieving the data from the data file and executing the script in the corresponding script file to render the data.

34. A method of rendering information on a mobile device, comprising:

intermittently receiving a data file and a corresponding script file, the data file including data indicative of substantive information to be rendered and the script file including script information indicative of a desired appearance which the substantive data is to take upon being rendered, the data file and corresponding script file being independently receivable by the mobile device;

storing the script file and data file; and retrieving the data from the data file and executing the script in the corresponding script file to render the data.

* * * * *

UNITED STATES PATENT AND TRADEMARK OFFICE
CERTIFICATE OF CORRECTION

PATENT NO. : 6,311,058 B1
DATED : October 30, 2001
INVENTOR(S) : Wecker et al.

It is certified that error appears in the above-identified patent and that said Letters Patent is hereby corrected as shown below:

Title page,
Item [56], References Cited, U.S. PATENT DOCUMENTS, add:

| | | | |
|---|---|---|---|
| 4,593,155 | 6/1986 | Hawkins | 79/2 |
| 4,916,637 | 4/1990 | Allen et al. | 364/513 |
| 5,014,345 | 5/1991 | Comroe et al. | 455/54 |
| 5,043,721 | 8/1991 | May | 340/825.44 |
| 5,367,667 | 11/1994 | Wahlquist et al. | 395/575 |
| 5,400,331 | 3/1995 | Lucak et al. | 370/85.1 |
| 5,603,025 | 2/1997 | Tabb et al. | 395/602 |
| 5,619,694 | 4/1987 | Shimazu | 395/615 |
| 5,619,615 | 4/1987 | Pitchaikani et al. | 395/11 |
| 5,623,656 | 4/1997 | Lyons | 395/610 |
| 5,640,590 | 7/1997 | Luther | 395/806 |
| 5,675,780 | 10/1997 | Plant-Mason et al. | 395/606 |
| 5,675,831 | 10/1997 | Caputo | 395/830 |
| 5,680,585 | 10/1997 | Bruell | 395/500 |
| 5,701,451 | 12/1997 | Rogers et al. | 395/600 |
| 5,705,995 | 1/1998 | Laflin et al. | 340/825.44 |
| 5,740,549 | 4/1998 | Reilly | 705/14 |
| 5,754,242 | 5/1998 | Ohkami | 348/441 |
| 5,796,952 | 8/1998 | Davis et al. | 395/299.54 |
| 5,809,247 | 9/1998 | Richardson et al. | 395/200.48 |
| 5,861,883 | 1/1999 | Cuomo et al. | 345/326 |
| 5,875,306 | 2/1999 | Bereiter | 395/200.5 |
| 5,884,097 | 3/1999 | Li et al. | 935/863 |
| 5,903,262 | 5/1999 | Ichihashi et al. | 345/327 |
| 5,920,696 | 7/1999 | Brandt et al. | 395/200.48 |
| 5,937,041 | 8/1999 | Cardillo, IV et al. | 379/93.25 |
| 5,953,523 | 9/1999 | Marinez et al. | 395/701 |
| 5,953,524 | 9/1999 | Meng et al. | 395/701 |
| 5,999,941 | 12/1999 | Anderson | 707/103 |
| 6,061,698 | 5/2000 | Chadha et al. | 707/513 |
| 6,078,743 | 6/2000 | Apte et al. | 395/701 |
| 6,085,224 | 7/2000 | Wagner | 709/203 |
| 6,112,242 | 8/2000 | Jois et al. | 709/225 |
| 6,118,391 | 9/2000 | Wecker | 341/55 |

After U.S. PATENT DOCUMENTS, insert:

```
FOREIGN PATENT DOCUMENTS
  0 434 231       6/1991      European Pat. Off.
  0 653 736       5/1995      European Pat. Off.
  0 704 827       4/1996      European Pat. Off.
  0 803 825      10/1997      European Pat. Off.
  WO 90/13213    11/1990      WIPO
  WO 97/17682     5/1997      WIPO
  WO 97/354402    9/1997      WIPO
```

UNITED STATES PATENT AND TRADEMARK OFFICE
CERTIFICATE OF CORRECTION

PATENT NO.    : 6,311,058 B1
DATED         : October 30, 2001
INVENTOR(S)   : Wecker et al.

It is certified that error appears in the above-identified patent and that said Letters Patent is hereby corrected as shown below:

Title page,
Item [56] cont'd, OTHER PUBLICATIONS, add:

```
Michail Salampasis et al., "Extending HTML in a principled way with displets.",
Computer Networks and ISDN Systems, Vol. 29, pp. 1115-1128, 1997.
Castedo Ellerman, "Channel Definition Format (CDF)", Channel Definition Format
Submission 970309, Mar. 1997.
Oliverio, G., "A Paging HPC", Handheld Systems, Creative Digital Publishing
Inc., (retrieved from Internet 6/10/99), No. 5.4, July 1997-August 1997,
Xp002106345.
Jason Levitt, "Push Your Web Pages--Netscape's Netcaster and Mircosoft's CDF
make it easier than ever to join the push revolution," INFORMATION WEEK, No.
634, June 9, 1997, XP002103295.
```

Column 1,
Line 51, replace "rung" with -- runs --.

Column 5,
Lines 47 and 48, replace "10" with -- 18 --.

Column 6,
Line 24, replace "memory 42" with -- memory 32 --.

Column 8,
Line 22, replace "drive 61" with -- drive 62 --.
Line 44, replace "object store 6" with -- object store 44 --.
Line 61, delete "are not".

Column 9,
Line 25, replace "carrier 15" with -- carrier 14 --.

Column 10,
Line 35, replace "driver 10" with -- driver 22 --.

Column 12,
Line 2, replace "layer 264" with -- layer 254 --.
Line 21, replace "emboidment" with -- embodiment --.
Line 57, replace "[Hdr, data}" with -- {Hdr, data} --.
Line 59, delete ",".

Column 13,
Line 38, replace "emboidment" with -- embodiment --.
Line 43, replace "unpacker" with -- unpackager --

UNITED STATES PATENT AND TRADEMARK OFFICE
CERTIFICATE OF CORRECTION

PATENT NO.   : 6,311,058 B1
DATED        : October 30, 2001
INVENTOR(S)  : Wecker et al.

It is certified that error appears in the above-identified patent and that said Letters Patent is hereby corrected as shown below:

Column 15,
Line 35, replace "form" first instance with -- from --.
Line 47, replace "the" second instance with -- to --.

Column 17,
Line 39, replace "perform" with -- performing --.

Signed and Sealed this

Fifth Day of August, 2003

JAMES E. ROGAN
*Director of the United States Patent and Trademark Office*